March 9, 1954 V. K. ELORANTA 2,671,379
OPHTHALMIC MOUNTING
Filed Aug. 23, 1950

Vaito K. Eloranta
INVENTOR

BY Donald E. Brown
and
Moncure B. Berg
ATTORNEYS

Patented Mar. 9, 1954

2,671,379

UNITED STATES PATENT OFFICE 2,671,379

OPHTHALMIC MOUNTING

Vaito K. Eloranta, Boston, Mass., assignor to Polaroid Corporation, Cambridge, Mass., a corporation of Delaware Application August 23, 1950, Serial No. 180,968

2 Claims. (Cl. 88—53)

This invention relates to ophthalmic mountings and more particularly has reference to a mounting having a simplified and inexpensive construction employing parts which are readily formed and assembled.

Objects of the invention are to provide an ophthalmic mounting having a frame and temples provided with means for hingedly securing the temples to the frame whereby the temples may be snapped into pivotal attachment with the frame by pressing the frame and the temples together, as well as to provide an ophthalmic mounting provided with a frame having elements thereon in the form of pins for securing the lenses to the frame.

Other objects of the invention are to provide a mounting of the character described having a frame and temples formed of an organic plastic material, especially moldable material which is deformable under heat and pressure; and to provide an ophthalmic mounting of the nature set forth having a frame provided with a hinge element at each end thereof and temples provided with a hinge element at the end thereof to be secured to the frame, a hinge element on the frame and a hinge element on the temple constituting a pair of elements adapted to be pivotally connected together, one of said elements comprising pin means and the other of said elements comprising at least one bifurcated member of resilient material detachably engageable with said hinge pin means.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 5:
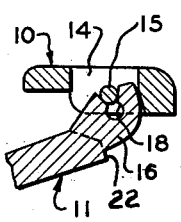
Figure 6:
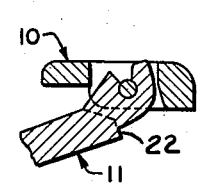
Figure 7:
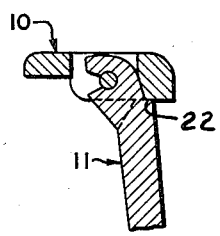
Figure 8:
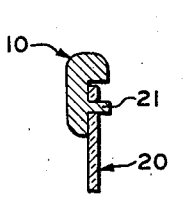
Figure 9:
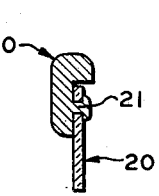

Figs. 5, 6 and 7 detail the hinge ends of the frame and a temple, with Fig. 5 showing the temple in a position for engagement with the frame and with Figs. 6 and 7 showing the temple engaged and hinged to the frame and with the temple shown as folded or inoperative in Fig. 6 and as open or operative in Fig. 7;

Fig. 8 is a section through the frame and a lens-holding pin and shows a lens engaged on the pin; and Fig. 9 is a section similar to Fig. 8 and shows the lens-holding pin functioning to secure the lens to the frame after the end of the pin has been upset.

As heretofore intimated, the present invention features an inexpensive ophthalmic mounting which is simple to manufacture and is capable of being assembled with great facility. An ophthalmic mounting of this character finds special use in the sunglass field and also as a viewer for three-dimensional vectographs, photographs and the like.

A practical manner of providing a structure of the desired character makes use of a frame and temples therefor which are readily molded of an organic plastic material. The frame is provided with a hinge element at each end thereof while each temple is also provided with a hinge element at the end thereof which is adapted to be hingedly connected to the frame. One hinge element of a pair of frame and temple hinge elements comprises hinge pin means while the other hinge element of said pair comprises at least one resilient bifurcated member which may be pressed into engagement with the hinge pin means as by being snapped thereon while pressing the frame and the temple together with the fingers. When the hingle members are so engaged, the temple is hinged to the frame for pivotal movement thereon. Removal of the temples, if desired, is accomplished by reversing this procedure.

In conjunction with these features of the invention, special means, comprising pins extending from a side of the frame, are employed for securing each lens on its respective lens seat. To accomplish this, the lens is provided with a plurality of openings along a marginal portion thereof. Each opening is engageable with one of said pins. After mounting the lens on the seat with the pins extending therethrough, the free ends of the pins are upset so that the upset material on the end of each pin is forced into securing contact with the lens whereby the lens is held in the frame. The use of a moldable thermoplastic material facilitates this practice.

Figure 1:
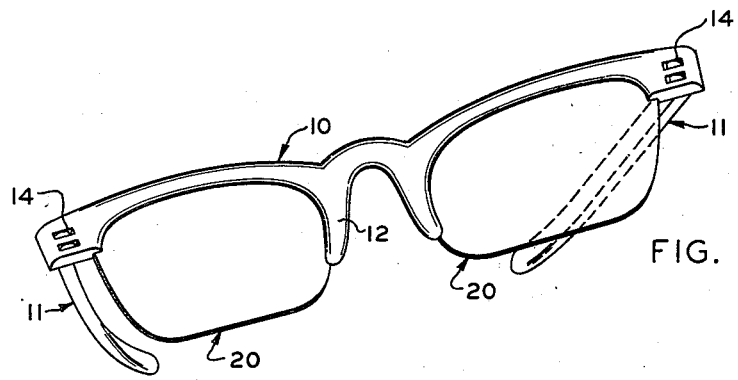
Figure 1 is a perspective view of one embodiment of an ophthalmic mounting forming the subject of this invention.
Figure 2:
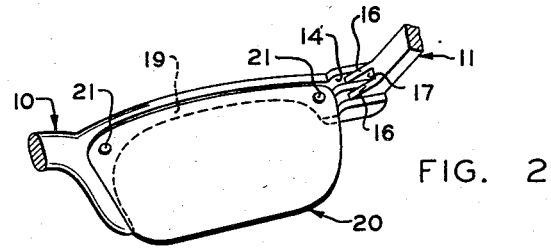
Fig. 2 is a perspective view showing the back of the mounting of Fig. 1 with parts thereof broken away.
Figure 3:
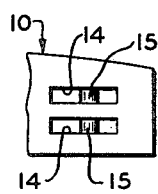
Fig. 3 is a partial plan view of the frame adjacent one end thereof.

In a preferred embodiment of the invention illustrated in the drawing, the ophthalmic mounting is shown as comprising a frame 10, temples 11 hingedly connected to each end of the frame and a pair of lenses 20 carried by the frame on each side of a central bridge portion 12 thereof. A hinge element is formed at each end of the frame 10 and is shown as comprising a set of two or more spaced-apart slots 14 which extend through the frame and which each have a hinge pin 15 mounted therein. Conveniently, each slot 14 may have a rectangular cross section and the slots in each set are positioned so that they are substantially parallel whereby the slots are operatively aligned. Preferably the frame 10 adjacent each end thereof is thickened, as shown in Fig. 2, in order to provide sufficient stock to support the hinge pin, especially in instances where the pin is slightly inclined from the vertical to permit the temples and the glasses to be supported on the face of a wearer at a desired tilt.

The temples 11 may be of any desired shape, for example the paddle type of temple illustrated. A feature of the invention resides in the fact that both temples are similar whereby the temples are interchangeable. Each temple 11 is provided at the frame end thereof with a hinge element which, in a preferred embodiment of the invention, comprises two or more bifurcated or branched members 16 which extend from the end of each temple 11 and are spaced apart in parallel relation so that they may be inserted within the spaced-apart slots 14 in the frame 10. By this construction, a slot 17 is formed between each pair of bifurcated members 16.

Each bifurcated or branched member 16 is a relatively thin and flat surfaced element which flares outwardly from the end of the temple and has its broadest surfaces forming the upper and lower surfaces of the member. The terms "upper" and "lower" are used with reference to the position of the ophthalmic mounting when being worn. Each cutaway portion 18 which extends between the branches or fingers of each bifurcated or branched member 16 has a circular part near the center of the member and a tapered part which joins the circular part and diverges outwardly from the circular part to the end of the branches of the member. The widest part of the taper of the cutaway portion 18 is adjacent the outer ends of the branches or fingers of a bifurcated member 16 and is located so that it will face towards the bridge 12 of the ophthalmic mounting when the temples are in open or operative position. The circular part of the cutaway portion 18 has a diameter substantially equal to the diameter of a hinge pin 15 while the taper of the cutaway portion at its narrowest location, adjacent to the circular part, has a width dimension slightly less than the diameter of a hinge pin 15.

Figure 4:
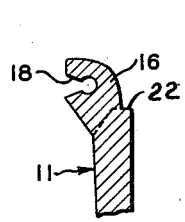
Fig. 4 is a partial plan view of a temple at the hinge end thereof.

It may be observed, especially in Figs. 4, 5 and 6 of the drawing, that by this arrangement the bifurcated portion extends from one extremity of the body of the temple and is so designed and constructed that it provides a shoulder 22 between its junction with the body of the temple and that side of the body portion which is located outwardly from the frame 10. Also, as may be observed in the drawing, the bifurcated members 16 of each bifurcated portion have their branches respectively parallel to each other and are positioned so that a plane which passes substantially midway between the branches of all said bifurcated members and which is, therefore, common thereto, is located at least approximately at a right angle to the generally longitudinal axis of the body portion of the temple. The shoulder 22 provides a stop which limits the movement of a temple 11 about its pivot in a direction outwardly from the frame 10.

For operatively mounting a temple 11 onto the frame 10, the bifurcated members 16 of the temple are inserted within the slots 14 at either end of the frame and with the mouth of the tapered part of each cutaway portion 18 aligned with a pin 15 for engagement therewith, as shown in Fig. 5. Slight application of pressure to the temple 11 and particularly to the bifurcated members 16 thereof may then be applied to move the temple and frame relative to each other and snap each set of members 16 into engagement with their respective hinge pins 15. The result of this procedure is shown in Fig. 6. Due to the fact that the circular part of each cutaway portion 18 is of a diameter similar to a hinge pin 15, while the smallest part of the taper of the cutaway portion 18 is less than the diameter of a hinge pin, the bifurcated members 16 and consequently a temple 11 will be hingedly locked to the frame 10 after engagement with the hinge pin. The resiliency of each bifurcated member 16 will assist in effecting this engagement as well as maintaining it. In fact, each bifurcated member 16 may be thought of as providing a resilient snap type of locking engagement. Fig. 7 shows a temple 11 and bifurcated member 16 in open or operative position after being engaged with the frame, while Fig. 6 makes a similar showing but with the temple in folded or inoperative position. If desired, each temple 11 may be removed from its hinged connection with the frame 10 by reversing the assembly operations just described.

As previously mentioned, another feature of the invention is the manner of securing the lenses to the frame 10 of the ophthalmic mounting. Conveniently, for this purpose, the back of the frame 10, as shown in Fig. 2, is so molded as to provide a lens seat 19 on each side of the bridge 12 for lenses 20. By the term "back," with reference to the frame, I mean that side of the frame which will be directly adjacent the face of a wearer of the ophthalmic mounting, while by the term "front," I mean that side of the frame which will be most distant from the face of a wearer when the ophthalmic mounting is worn. If desired, each seat 10 may be recessed below the body of frame 10 as shown. Extending from each lens seat 19 are two or more pins 21 which are employed for securing a lens 20 to the frame.

Each lens 20 is provided with a plurality of holes equal in number to the pins 21 on a lens seat. These holes are located adjacent the upper edge of the lens for registration with the pins 21 whereby each lens may be mounted on the seat 19 to have pins 21 extend through the lens, as is shown in Figs. 2 and 8. Each lens 20 is readily retained in mounted position by upsetting or overturning the outer end of each pin 21 by the application of heat and/or pressure thereto. The result of this operation, shown in Fig. 9, is to flatten out the end of each pin and to provide a rivet type of fastener which effectively secures the lens to the frame.

Various modifications fall within the scope of this invention. For example, the slots and hinge pins shown in association with the frame may be substituted at the ends of a temple 11 for the bifurcated members 16 thereof and the ends of the frame may be provided with the bifurcated members. Similarly, the slots 14 shown at the end of the frame may be omitted and the frame merely provided with a tongue having a hinge pin extending from each side thereof. As another variation, a single slot with hinge pin therein may be formed at each end of the frame and each temple may be provided with a single bifurcated member 16 of a thicker construction than that illustrated. Likewise, it is possible to mount the lenses on the front of the frame by the use of lens-holding pins on the front surface thereof. Also, a lens seat which is flush with the body of the frame 10 may be employed in place of the illustrated recessed seat. An advantage in using a recessed lens seat resides in giving a greater clearance between the lens and the eyelashes of a wearer of the ophthalmic mounting. Of course, similar or even greater clearance is obtainable by mounting a lens 20 on the front of the frame 10 but at the sacrifice of the appearance of the device.

As heretofore mentioned, the frame 10, including the lens-holding pins 21 thereof, the slots 14 and hinge pins 15, are formed of an organic plastic material by conventional molding practices. Similarly, each temple 11, including the bifurcated fingers 16 thereof, are also formed of an organic plastic material and are likewise easily molded by conventional procedures. Preferably a thermoplastic material is employed. This facilitates upsetting the lens-holding pins 21 by the application of heat and/or pressure thereto for the purpose of securing each lens in mounted position. Many plastics suitable for this purpose are well known to the art and need no detailed discussion. Examples of preferred materials may be mentioned, as cellulose acetate, cellulose butyrate, cellulose acetate butyrate, polystyrene, and the like.

The lenses are preferably formed of plastic sheet material, although they may be glass which is suitably drilled for engagement with the hinge pins. The lens surfaces may have substantially plane or flat surfaces or they may have curved surfaces, for example spherical surfaces. In the latter event the lenses will be preformed to the desired curvature and the frame will be provided with a suitably shaped seat, also curved, so that the seat will be in overall contact with the portion of a lens to be supported thereon. The lenses 20, shown in the drawing, are of the plane type.

Lenses 20 are formed of a suitable transparent, deformable plastic material and may comprise a single sheet or a lamination of several sheets of such material. A preferred practice makes use of a lamination formed of a central sheet of transparent plastic which is sandwiched between outer protecting plastic sheets. In this embodiment, the central sheet has the property of modifying incident light, as by filtering action or by polarizing the same.

The central sheet is preferably formed of any transparent, hydrophilic, linear polymeric plastic material which may be treated to effect a desired orientation of its molecules. An example of a preferred material of this character is polyvinyl alcohol. As examples of other such materials mention may be made of partially hydrolyzed polyvinyl acetals and polyvinyl alcohol esters, regenerated cellulose, suitably prepared nylon-type plastics, and the like. When the just-named materials are in molecularly oriented condition and are stained or dyed with a dichroic material, they become light polarizing.

The outer sheets are preferably formed of any hydrophobic or nonhydrophilic plastic material, and examples thereof comprise cellulosic plastics such as cellulose nitrate or cellulose esters such as cellulose acetate and cellulose propionate, or cellulose mixed esters such as cellulose acetate butyrate, or a vinyl compound such as the vinyl acetate-vinyl chloride copolymers, or a condensation type superpolymer such as a polyamide or nylon-type plastic. It is possible to incorporate a dye, as by casting, in the cellulosic plastics just named, and in such event the same may be employed as the light-modifying sheet of the lamination. Obviously, any of the materials just described, if of sufficient thickness, may be used in place of the three-layered lamination heretofore described.

For the purposes of discussion, the invention is assumed as being equipped with lenses 20 which have the ability to polarize light. The light-polarizing sheet of each lens is arranged, in the case of sunglass use, so that the transmission axis thereof is substantially vertical while, for three-dimensional viewing of vectographs or other type of three-dimensional light-polarizing images, the light-polarizing sheet for the lenses will be arranged so that the transmission axis for one lens will be located at substantially 90° to the position of the transmission axis for the polarizing material of the other lens.

Any of the heretofore-mentioned hydrophilic, linear polymeric plastics may be employed in the formation of light-polarizing sheet material. A preferred example of such a material is disclosed in the patent to Edwin H. Land, No. 2,237,567, for Light Polarizer and Process for Manufacturing the Same. Another suitable polarizing material for this purpose is disclosed in the patent to Edwin H. Land and Howard G. Rogers, No. 2,173,304, for Light Polarizer. Other types of polarizers may be utilized with the invention, for, as previously indicated, the scope of the invention is comprehensive of any type of sheet polarizing material.

Lenses 20 may also be constructed to provide modifying effects upon light besides the polarization thereof such, for example, as effecting the absorption of light which is incident on the lens and which falls within a predetermined portion or portions of the spectrum, including the ultraviolet and the infrared portions thereof. Effects of this character may be obtained by appropriate treatment of the light-modifying sheet used with lens 20 and includes the use of a dye or combination of dyes or substantially colorless filtering material incorporated in the plastic sheeting. The invention also includes the use of lens means wherein one lens is of one color and the other lens is of a different color for use in connection with viewing stereoscopic pairs of images such as anaglyphs and the like.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. In an ophthalmic mounting, in combination, a frame, said frame being provided with a plurality of spaced-apart slots extending through said frame and located adjacent each end thereof, a pair of temples, each adapted to be hingedly connected to said frame at an end thereof, and a hinge pin mounted in each slot, each said temple having a body portion provided at one extremity thereof with a bifurcated portion which extends therefrom, said bifurcated portion of each said temple providing a shoulder between the junction of the bifurcated portion with the body of the temple and that side of the body of the temple which is located outwardly of said frame, each said bifurcated portion including a plurality of similarly shaped branched members which are aligned with each other in spaced-apart and substantially parallel relation, said branched members being positioned so that a plane which passes substantially midway between the fingers of each said branched member and which is common to all said branched members is located at least approximately at a right angle to the general longitudinal axis of the body portion of the temple, each branched member being removably mounted within a slot at the end of said frame with which said temple is associated and being frictionally engaged partially around the hinge pin of said slot and pivotal about said hinge pin, and each said shoulder being contactable with said frame at the outer side of the slots and providing means limiting the pivotal hinging movement of the temple with which it is associated in a direction away from said frame.

2. An ophthalmic mounting as defined in claim 1 wherein each branched member has a cutaway portion between the fingers thereof which has a circular part and a tapered part, said circular part of each said cutaway portion being engageable around the hinge pin with which said branched member is associated and having a diameter substantially equal to the diameter of said hinge pin, said tapered part of each said cutaway portion having a width adjacent the circular part thereof which is less than the diameter of the hinge pin with which the branched member is engaged, and said tapered part of each said cutaway portion diverging outwardly from said circular part thereof.

VAITO K. ELORANTA.

References Cited in the file of this patent

UNITED STATES PATENTS

| Number | Name | Date |
|---|---|---|
| 2,192,208 | Stevens | Mar. 5, 1940 |
| 2,210,507 | Spill | Aug. 6, 1940 |
| 2,240,725 | Styll | May 6, 1941 |
| 2,290,389 | Slotsky | July 21, 1942 |
| 2,300,318 | Schumacher | Oct. 27, 1942 |
| 2,436,606 | Rohrbach | Feb. 24, 1948 |
| 2,504,157 | Rosenheim | Apr. 18, 1950 |

FOREIGN PATENTS

| Number | Country | Date |
|---|---|---|
| 954,467 | France | Dec. 26, 1949 |